US009031849B2

(12) United States Patent
Liu et al.

(10) Patent No.: US 9,031,849 B2
(45) Date of Patent: May 12, 2015

(54) SYSTEM, METHOD AND MULTIPOINT CONTROL UNIT FOR PROVIDING MULTI-LANGUAGE CONFERENCE

(75) Inventors: Zhihui Liu, Shenzhen (CN); Zhonghui Yue, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1157 days.

(21) Appl. No.: 12/413,008

(22) Filed: Mar. 27, 2009

(65) Prior Publication Data
US 2009/0187400 A1 Jul. 23, 2009

Related U.S. Application Data

(63) Continuation of application No. PCT/CN2007/070835, filed on Sep. 29, 2007.

(30) Foreign Application Priority Data

Sep. 30, 2006 (CN) .......................... 2006 1 0063017

(51) Int. Cl.
*G10L 21/00* (2013.01)
*G06F 17/20* (2006.01)
(Continued)

(52) U.S. Cl.
CPC .............. *H04N 7/152* (2013.01); *G06F 17/289* (2013.01); *H04M 3/56* (2013.01); *H04M 2203/2061* (2013.01)

(58) Field of Classification Search
CPC ... G06F 17/28; G06F 17/2809; G06F 17/289; G09B 7/02; G09B 7/00; H04M 3/56; H04M 3/561; H04M 3/562; H04M 3/563; H04M 3/566; H04M 3/568; H04M 3/569
USPC ...................... 704/2–8, 270, 270.1, 277, 275; 379/2.01, 88.01–88.16; 455/416; 434/350
See application file for complete search history.

(56) References Cited

U.S. PATENT DOCUMENTS 5,815,196 A 9/1998 Alshawi
5,818,442 A * 10/1998 Adamson ...................... 715/753
(Continued)

FOREIGN PATENT DOCUMENTS

CN 86201054 U 12/1986
CN 1209023 A 2/1999
(Continued)

OTHER PUBLICATIONS

Communication from the European Patent Office in corresponding European Patent Application No. 07817026.3 (Nov. 3, 2009).
(Continued)

*Primary Examiner* — Paras D Shah
(74) *Attorney, Agent, or Firm* — Leydig, Voit & Mayer, Ltd.

(57) ABSTRACT

A system for providing multi-language conference is provided. The system includes conference terminals and a multipoint control unit. The conference terminals are adapted to process a speech of a conference site, transmitting the processed speech to the multipoint control unit, process an audio data received from the multipoint control unit and output it. At least one of the conference terminals is an interpreting terminal adapted to interpret the speech of the conference according to the audio data transmitted from the multipoint control unit, process the interpreted audio data and output the processed audio data. The multipoint control unit is adapted to perform a sound mixing process of the audio data from the conference terminals in different sound channels according to language types, and then sends mixed audio data after the sound mixing process to the conference terminals.

10 Claims, 14 Drawing Sheets

(51) Int. Cl.
*G06F 17/27* (2006.01)
*G06F 17/28* (2006.01)
*H04M 3/42* (2006.01)
*G09B 3/00* (2006.01)
*H04N 7/15* (2006.01)
*H04M 3/56* (2006.01)

(56) References Cited

U.S. PATENT DOCUMENTS

| | | | |
|---|---|---|---|
| 6,850,266 B1 | 2/2005 | Trinca | |
| 7,617,094 B2* | 11/2009 | Aoki et al. | 704/206 |
| 8,078,449 B2* | 12/2011 | Nagao | 704/8 |
| 2002/0188731 A1 | 12/2002 | Potekhin et al. | |
| 2003/0152040 A1 | 8/2003 | Crockett et al. | |
| 2004/0033478 A1* | 2/2004 | Knowles et al. | 434/350 |
| 2004/0072134 A1 | 4/2004 | Takahashi | |
| 2005/0091444 A1 | 4/2005 | Vicory et al. | |
| 2005/0251421 A1* | 11/2005 | Chang et al. | 705/2 |
| 2006/0055771 A1 | 3/2006 | Kies | |
| 2006/0120307 A1 | 6/2006 | Sahashi | |
| 2006/0126821 A1 | 6/2006 | Sahashi | |
| 2006/0165225 A1 | 7/2006 | Sahashi | |
| 2006/0248210 A1* | 11/2006 | Kenoyer | 709/231 |
| 2007/0282664 A1* | 12/2007 | Monster | 705/10 |
| 2012/0206564 A1 | 8/2012 | Potekhin et al. | |
| 2012/0308979 A1 | 12/2012 | Knowles et al. | |

FOREIGN PATENT DOCUMENTS

| | | |
|---|---|---|
| CN | 1685696 A | 10/2005 |
| CN | 1685697 A | 10/2005 |
| CN | 1685698 A | 10/2005 |
| CN | 1741008 A | 3/2006 |
| CN | 1801860 A | 7/2006 |
| CN | 1845573 A | 10/2006 |
| CN | 1937664 A | 3/2007 |
| CN | 101702762 B | 3/2012 |
| EP | 1 357 493 A1 | 10/2003 |
| JP | 2260959 A | 10/1990 |
| JP | H05167698 A | 7/1993 |
| JP | H07162989 A | 6/1995 |
| JP | 2003032373 A | 1/2003 |
| JP | 2004187126 A | 7/2004 |
| JP | 2004274258 A | 9/2004 |
| JP | 2004531952 A | 10/2004 |
| JP | 2005184583 A | 7/2005 |
| JP | 2005536133 A | 11/2005 |
| JP | 2006203548 A | 8/2006 |
| JP | 2006-268561 A | 10/2006 |
| RU | 2144283 C1 | 1/2000 |
| RU | 2004127455 A | 1/2006 |
| RU | 2293368 C2 | 2/2007 |
| SU | 1570025 A1 | 6/1990 |
| WO | WO 9823075 A2 | 5/1998 |
| WO | WO 99/63756 A1 | 12/1999 |
| WO | WO 2004/030329 A1 | 4/2004 |
| WO | WO 2004028161 A1 | 4/2004 |
| WO | WO 2006/023961 A2 | 3/2006 |

OTHER PUBLICATIONS

Communication from the European Patent Office in corresponding European Patent Application No. 07817026.3 (Jun. 18, 2010).
Official Action from the Russian Patent Office in corresponding Russian Patent Application No. 2009116477/09 (Mar. 29, 2010).
Official Action from the Russian Patent Office in corresponding Russian Patent Application No. 2009116477/09 (published prior to Mar. 29, 2010—date not available).
1st Office Action in corresponding Chinese Application No. 200910221012.6 (Oct. 29, 2010).
Pretrial Inquiry in corresponding Japanese Patent Application No. 2012-16389 (Feb. 5, 2013).
Decision of Refusal in corresponding Japanese Patent Application No. 2010-524340 (Apr. 3, 2012).
Notice of Allowance in corresponding Russian Patent Application No. 2009116477/09(022613) (Sep. 1, 2010).
1st Office Action in corresponding Chinese Patent Application No. 2009-529506 (Jul. 23, 2013).
Written Opinion of the International Searching Authority in corresponding PCT Application No. PCT/CN2007/070835 (Jan. 3, 2008).
International Search Report in corresponding PCT Application No. PCT/CN2007/070835 (Jan. 3, 2008).
1st Office Action in corresponding Chinese Application No. 200610063017.7 (Nov. 7, 2008).
2nd Office Action in corresponding Chinese Application No. 200910221012.6 (Apr. 8, 2011).
Rejection Decision in corresponding Japanese Application No. 2009-529506 (Jul. 28, 2011).

* cited by examiner (1) Data of conference site with highest Chinese volume
(2) Data of conference site with highest English volume (1) Data of conference site with highest Chinese volume
(2) Data of conference site with highest English volume

SYSTEM, METHOD AND MULTIPOINT CONTROL UNIT FOR PROVIDING MULTI-LANGUAGE CONFERENCE

CROSS-REFERENCE TO RELATED APPLICATIONS

This application is a continuation of International Patent Application No. PCT/CN2007/070835, filed Sep. 29, 2007, which claims priority to Chinese Patent Application No. 200610063017.7, filed Sep. 30, 2006, both of which are hereby incorporated by reference in their entireties.

FIELD OF THE TECHNOLOGY

The present invention relates to the field of communication technology, and more particularly, to a system, method, and multipoint control unit for providing multi-language conference.

BACKGROUND

In recent years, with the development of communication technologies, video conferences have found broad applications. Video conferences commonly refer to TV conference services. Through multimedia communication means, a conference is held by using television equipments and communication networks, so as to provide an interaction of images, voices and data simultaneously between two or more geographical locations. As shown in FIG. 1, a video conference is generally composed of video terminals (i.e., conference terminals), a transmission network and a multipoint control unit (MCU).

Video terminal equipments mainly include video input/output equipments, audio input/output equipments, a video codec, an audio codec, information communication equipments and multiplexing/signal distributing equipments etc. The video terminals have a basic function of performing compression coding on the image signals shot by local cameras, sound signals captured by microphones, and transmitting the signals to a remote conference site through the transmission network. At the same time, the video terminals receive signals from the remote conference site, reduce the signals to analog images and sound signals after decoding. The processing of the audio signals is shown in FIG. 2 and the description thereof is given below.

In order to form a complete TV conference system, the video terminal equipments and the MCU have to be connected together through the communication network, and transmitting channels may be in the form of optical fibers, electric cables, microwaves or satellites.

The MCU is a control core of the video conference. When the number of the conference terminals participating in the conference is more than two, a control through the MCU is necessary. All conference terminals need to be connected to the MCU through standard interfaces. The MCU is realized according to protocols such as international standard H.221, and H.245. The MCU mainly functions to provide the mixing and exchange of images and voices and the control of all conference sites.

The MCU processes the audio data to provide sound mixing of multipoint conference sites, and the conference sites participating in the sound mixing are the conference sites with higher volumes among the multipoint conference sites. If a three-point sound mixing is to be realized, the conference sites participating in the sound mixing are three conference sites with largest volumes among the multipoint conference sites. A sound mixing policy is introduced as follows.

1) When a speech is given from one conference site, the speaker at the conference site may not hear its own voice while participants at all other conference sites may hear the voice of the speaking conference site.

2) When a speech is given from two conference sites, both of the speakers at the speaking conference sites may hear the voices of each other, but may not hear their own voices, while participants at all other conference sites may simultaneously hear the voice of the two speaking conference sites.

3) When a speech is given from three or more conference sites, the three conference sites having the largest volumes participate in the sound mixing. As shown in FIG. 3, T1, T2, T3 are the three conference sites having the largest sound volumes among the current conference sites, speaker at any one of the three conference sites may hear the voices of the other two conference sites, for example, the speaker at T1 conference site may hear the voices from T2 and T3 conference sites, and the speakers on all the other conference sites may simultaneously hear the voices from all three conference sites.

When a conference is held employing current video conference system, the processing of sound by the conference system is shown in FIG. 2. The data of speaking conference site is sent to the MCU after being encoded, the MCU performs sound mixing process on the sound data of the speaking conference site and sends the processed sound data to other conference terminals, and the participants on the other terminals may hear the sound of the speaking conference site after decoding the sound data. In the current video conference system, the MCU and the video terminal process the sound data of a certain conference site as one flow of data. When only one language is spoken in the entire conference system, the communication among multiple conference sites may be performed smoothly. But when two or more languages are spoken in the entire conference system, obstacles in language communication among participants may occur. To solve this problem, the conventional art utilizes the following two solutions. The following description takes a conference mixing Chinese and English as an example where the participants at one of multiple conference sites speak in English.

The first method is that all other Chinese conference sites are allocated with their own interpreters respectively to interpret English into Chinese for their own conference sites in order to understand the spoken contents of the above English conference site. As a result, if the conference scale is relative large, many interpreters are required, thus leading to waste of personnel. Moreover, when the interpreter on each Chinese conference site is interpreting, the microphone delivers the interpreted data to other conference sites, therefore the scene may be chaotic and is not feasible in practice. If the microphone is set not to deliver the interpreted data to other conference sites, the speaking conference site does not know whether the interpretation on Chinese conference sites is completed or not, and may not control its own speaking speed, thus resulting in a poor quality of the entire conference.

The second method is that a conference site is assigned as a dedicated interpreting terminal to interpret the speech of the conference sites participating in the sound mixing. But the solution also has disadvantages. If English is spoken at a conference site, and the interpreting terminal interprets English into Chinese, participants at each of the conference sites may hear English first followed by Chinese. But in fact, participants on the Chinese conference sites do not need to hear the English speech, and participants on the English conference sites also do not need to hear the interpreted Chinese speech. This causes the participants to have to hear much undesired information. Chinese and English are mixed, thus causes conference disorders, and the participants quickly become fatigued. In addition, the interpretation may slow down the conference's pace, and reduce the efficiency.

Considering the case in which three or more languages are spoken in a conference, and the languages are spoken concurrently at multiple conference sites, the above two solutions cause poor conference quality and are not practical given the effect of sound mixing.

SUMMARY

In view of this, embodiments of the present invention provides a system, method, and multipoint control unit for providing a multi-language conference to make each of the conference sites only use a selected language to participate in the conference with a few interpretation resources in a multi-language multipoint conference system.

The embodiment of the present invention provides a system for providing a multi-language conference, which includes conference terminals and a multipoint control unit.

The conference terminals are adapted to process speech of a conference site, transmitting the processed speech to the multipoint control unit, process an audio data received from the multipoint control unit and output the processed audio data. At least one of the conference terminals is an interpreting terminal adapted to interpret the speech of the conference site according to the audio data transmitted from the multipoint control unit, process the interpreted audio data and output the processed audio data.

The multipoint control unit is adapted to perform a sound mixing process of the audio data from the conference terminals in different sound channels according to language types and send mixed audio data after the sound mixing process to the conference terminals.

The embodiment of the present invention provides a method for providing a multi-language conference, which includes the following steps.

A multipoint control unit receives audio data transmitted from each of conferences terminals, performs a sound mixing process of the audio data from each of the conference terminals in different sound channels according to language types and sends the processed audio data to the conference terminals.

The audio data received by the multipoint control unit includes the audio data sent to the multipoint control unit after the conference terminals process the speech from a conference site and/or the audio data sent to the multipoint control unit after an interpreting terminal interprets the speech of the conference site according to the audio data transmitted from the multipoint control unit and processes the interpreted audio data.

The embodiment of the present invention provides a computer readable medium residing on a multipoint control unit. The computer readable medium including one or more computer executable programs stored therein, the computer executable programs includes instructions for receiving audio data transmitted from plurality of conference terminals, instructions for performing a sound mixing process of the audio data from the plurality of conference terminals in different sound channels according to language types and instructions for sending the processed audio data to the plurality of conference terminals.

The received audio data comprises: the audio data sent to the multipoint control unit after the conference terminals process a speech from a conference site, and/or the audio data sent to the multipoint control unit after an interpreting terminal of the conference terminals interprets the speech from the conference site according to the audio data transmitted from the multipoint control unit and the interpreting terminal processes the interpreted audio data.

As is known from the above technical scheme, in the embodiments of the present invention, because multi-channel technology is used, participants on each of the conference sites may hear the speech in a single language, and may also hear the speech in needed language as desired, thereby successfully avoiding useless language information. Because multi-channel technology is used, speaking in multiple languages in a conference system is realized successfully, in the mean time the multiple languages do not disturb each other, and different languages are combined seamlessly, thereby satisfying the demand of languages for different persons.

DETAILED DESCRIPTION

In the system and method described according to the embodiment of the present invention, by using a multi-channel processing technology in an MCU of a multipoint conference system, different sound channels are set according to different languages, and the audio data in different languages is processed according to different sound channels. The process according to different sound channels refers to processing audio data in various languages through the respective corresponding sound channels. For example, Chinese audio data is processed in sound channel 1, English audio data is processed in sound channel 2 and the processing of audio data in various languages does not disturb each other. The multipoint conference system described in the embodiment of the present invention includes not only a conventional pure-voice multipoint conference system, but also a TV conference system or a video conference system.

The embodiment of the present invention takes a Chinese-English multipoint conference as an example and other conferences using two or more languages are processed in a similar way.

Figure 4:
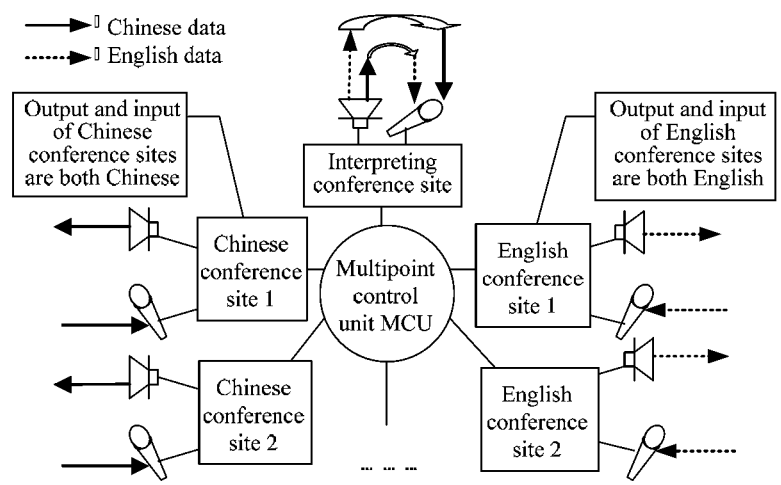
FIG. 4 is a schematic view of an application scene of an embodiment of the present invention.
Figure 5:
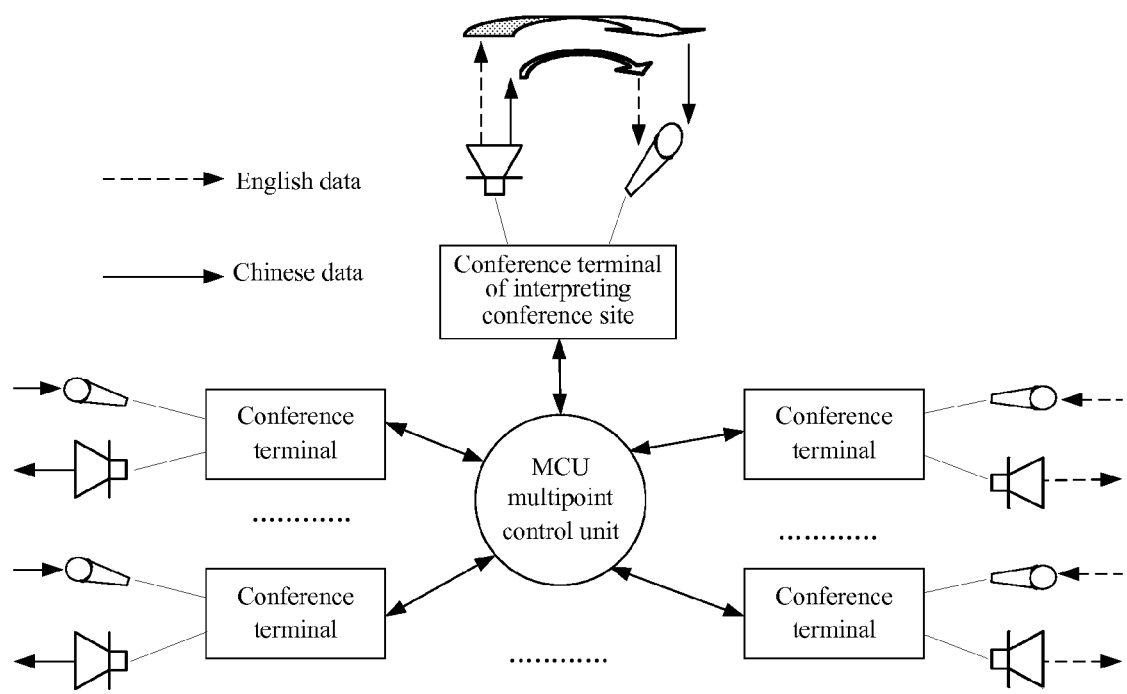
FIG. 5 is a schematic view of a system according to an embodiment of the present invention.

Referring to FIG. 4, an application scene of an embodiment of the present invention is described. Each of the conference sites corresponds to a conference terminal, and any one of the conferences sites in the multipoint conference system is assigned as an interpreting conference site responsible for interpreting Chinese into English or interpreting English into Chinese for the speech of each of the conference sites. Referring to FIG. 5, the system according to the embodiment of the present invention includes each of the conference terminals and an MCU.

A first embodiment of the system of the present invention is described below.

The conference terminal and an interpreting terminal (the conference terminal of interpretation conference site is referred to as the "interpreting terminal") only use one input and output interface, the MCU adopts mixing of sounds from multiple sound channels, and the MCU assigns languages to which the conference terminals correspond and the conference terminal acting as the interpreting terminal. In this scheme, there are no special requirements for the conference terminals and the interpreting terminal, and the majority of work is completed by the MCU. Various parts are described in detail as follows.

Figure 6:
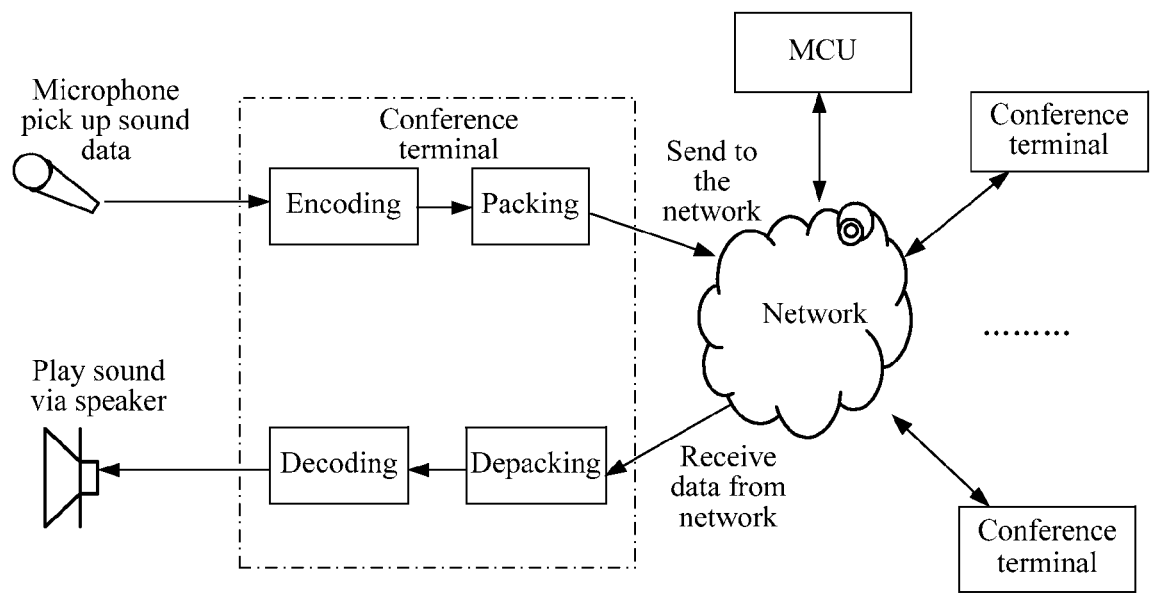
FIG. 6 is a schematic view of a processing scheme of an audio data by conference terminals in the system according to a first embodiment of the present invention.

As in FIG. 6, the conference terminal gathers locally input audio signals, encode the signals and send the encoded signals to the MCU. The conference terminal also receives an audio code stream sent form the MCU and plays the audio code stream after decoding. As such, the conference terminal does not need to differentiate input and output languages.

The interpreting terminal is responsible for interpreting the language of the speech in each of the conference sites, for example, interpreting Chinese speech into English, or interpreting English speech into Chinese. In this embodiment, simultaneous interpretation by interpreters may be performed on the interpreting conference site, or intelligent simultaneous machine interpretation may also be performed by using interpreting machines. Because simultaneous interpretation is introduced, the conference delay caused by interpretation may be ignored essentially, thereby effectively ensuring the smooth completion of the conference.

Figure 7:
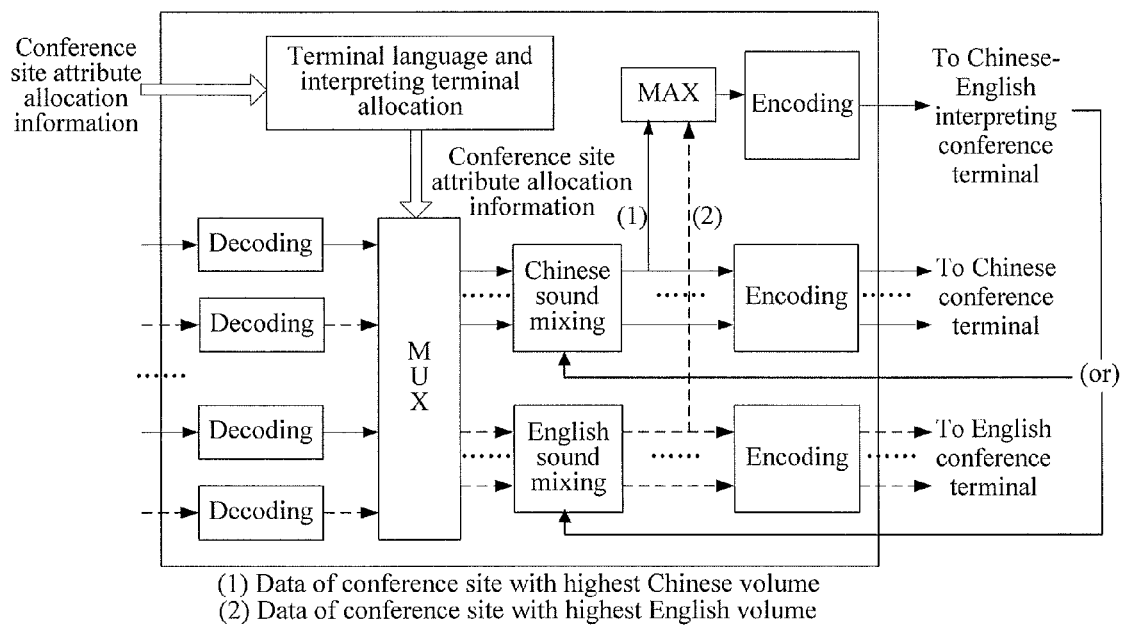
FIG. 7 is a schematic view of a processing scheme of an audio data by a multipoint control unit in the system according to the first embodiment the present invention.

As shown in FIG. 7, when dispatching the conference, the MCU assigns language information for each of the conference terminals first and assigns a conference terminal having simultaneous interpretation function as the interpreting terminal. For example, the language of a conference terminal 1 is assigned to be Chinese, the language of a conference terminal 2 is assigned to be English and a conference terminal 3 is assigned to be the interpreting terminal in the mean time. When the MCU receives audio data from a conference terminal, decoding is performed first, and then the decoded voice data is sent to a corresponding language mixer for sound mixing according to the language information assigned for the conference terminal. For example, for a conference terminal being assigned Chinese, the MCU sends the received audio data of this conference terminal to a Chinese mixer for sound mixing, and sends the audio data of the conference terminal assigned English to an English mixer for sound mixing. The audio data sent by the interpreting terminal to the MCU always participates in the sound mixing, and the language of the sound mixing in which it participates is introduced below. After the MCU performs sound mixing individually according to different languages, the sound mixing policy for various languages may be obtained with reference to the conventional art, the data after the sound mixing is sent to the corresponding conference terminals being assigned languages respectively. For example, conference terminals participating in Chinese sound mixing receive the corresponding data subject to Chinese sound mixing, and conference terminals participating in English sound mixing receive corresponding data subject to English sound mixing.

Figure 1:
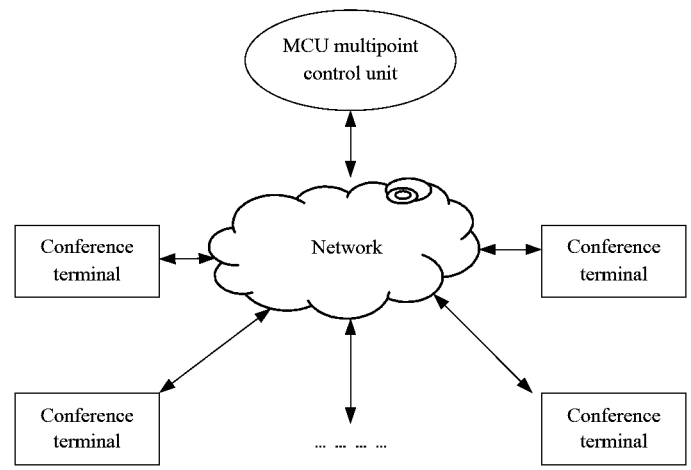
FIG. 1 is a schematic view of a system for holding a multipoint video conference of the conventional art.
Figure 2:
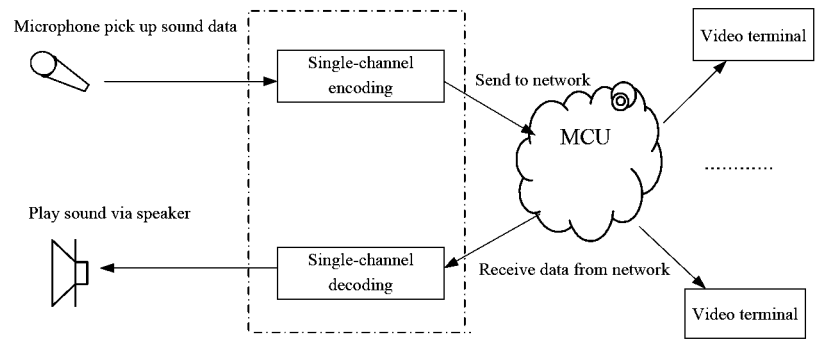
FIG. 2 is a schematic view of a processing scheme of an audio data by conference terminals in the conventional art.
Figure 3:
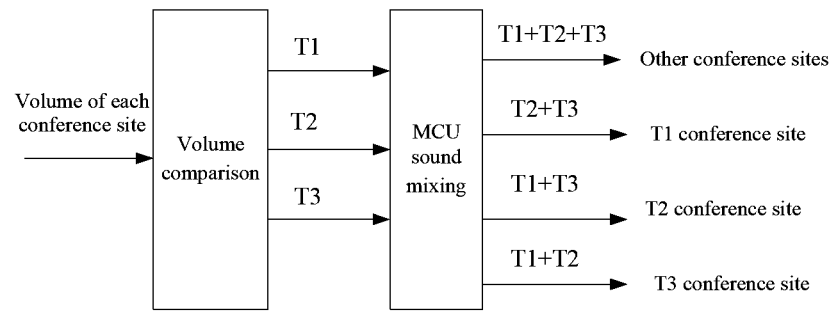
FIG. 3 is a schematic view of a sound mixing policy of a multipoint control unit in the conventional art.

The MCU sound mixing has two steps. Firstly, the volume size of each of the conference sites is compared, and secondly, the conference sites whose sound is to be broadcasted are selected according to the volume size thereof, and the sound is sent to receiving conference sites. The sound mixing may adopt one-party sound mixing, two-party sound mixing, three-party sound mixing, even four or more party sound mixing. In one-party sound mixing, only the party with the highest sound is broadcasted to each of the conference sites. In two-party sound mixing, only two parties with the highest sound are broadcasted after being mingled, and the participants on the two conference sites with the highest sound being broadcasted may not hear their own sound, but may hear the sound of the other party. One-party sound mixing and two-party sound mixing tend to result in the disadvantage of word-cut in an interactive conference involving more than three conference sites. Therefore, three-party sound mixing is put forward, and a schematic view of three-party sound mixing is shown in FIG. 3.

The volumes of different conference sites are compared to determine three conference sites with the largest sounds, namely, T1, T2, and T3, which participating in the sound mixing. The data of the T1, T2 and T3 is sent to other conference sites which do not participate in the sound mixing after data adding. The participants on the T1, T2, and T3 hear respectively the mingled sound of other two conference sites, i.e., the participants on the T1 hear the mingled sound of the T2 and T3 conference sites, the participants on the T2 hear the mingled sound of the T1 and T3 conference sites, and the participants on the T3 hear the mingled sound of the T1 and T2 conference sites. The one-party sound mixing is easy to be realized, and is relatively fit for the case in which only the chairman speaks, but the interactive performance thereof is poor. The two-party sound mixing may have certain level of interactivity, but when a third party inserts a word, the case in which the sound of one party is cut tends to occur. The interactive effect of three-party sound mixing is relatively good.

After the MCU has mixed the sound independently according to different languages, the sound mixing result is sent respectively to corresponding conference terminals being assigned languages. For example, conference terminals participating in Chinese sound mixing receive corresponding data subject to Chinese sound mixing, and conference terminals participating in English sound mixing receive corresponding data subject to English sound mixing.

In FIG. 7, each pair of languages use only one interpreting terminal, for example, a Chinese-English interpreting terminal may interpret Chinese into English, and may also interpret English into Chinese. Because the interpreting work of speeches of various conference sites is processed densely in a few conference sites, the interpretation resources are saved greatly while guaranteeing the quality of interpretation, thus reducing the conference cost. When one-party sound mixing is adopted, sound of a party in the Chinese and English languages with the highest sound is sent to the interpreting terminal. The interpreting terminal, which does not participate in the volume comparison, sends the audio data with the highest volume to the interpreting conference site. If Chinese is spoken at the highest volume, then the audio data language sent to the interpreting terminal is Chinese. In the next sound mixing, the audio data of the interpreting terminal participates in the English language sound mixing. If English is spoken at the highest volume, the audio data language sent to the interpreting terminal is English. In the next sound mixing, the audio data of the interpreting terminal participates in Chinese language sound mixing. Although only the louder one of Chinese and English languages is sent to the interpreting terminal, the sound mixing of Chinese language or English language itself may adopt one-party, two-party, three-party, even four or more party sound mixing. The interpreting terminal always participates in the sound mixing of the corresponding language with the highest volume or one of the highest volumes.

When two-party sound mixing is used, the audio data with the highest volumes of two parties is selected to be sent to the interpreting terminal for interpretation, and thus two interpreting terminals are required. One interpreting terminal interprets the sound of the conference site with the first highest volume, and the other interpreting terminal interprets the sound of the conference site with the second highest volume. The volume of the interpreting conference site does not participate in the volume comparison. The interpreted sound is sent to the mixer of a corresponding language for sound mixing. If both parties with the highest volumes are Chinese or English, the data interpreted by the interpreting terminals participates in the sound mixing of English or Chinese in the next sound mixing as two parties with the highest volumes or two of several parties with the highest volumes. If one of the two parties with the highest volumes is Chinese and the other is English, then the two parties participate in English and Chinese sound mixing respectively after being interpreted by corresponding interpreting terminal. The interpreting terminal always participates in the sound mixing, and the volume thereof may be equal to that of the conference site for which it interprets, or may be one of the highest volumes. Likewise, Chinese language mixer or English language mixer may adopt two-party, three-party or multi-party sound mixing.

When three-party or multi-party sound mixing is used, the processing of sound mixing is similar to that of two-party sound mixing, and three or more interpreting terminals are required to interpret the volumes of several parties with the highest volumes.

Figure 8:
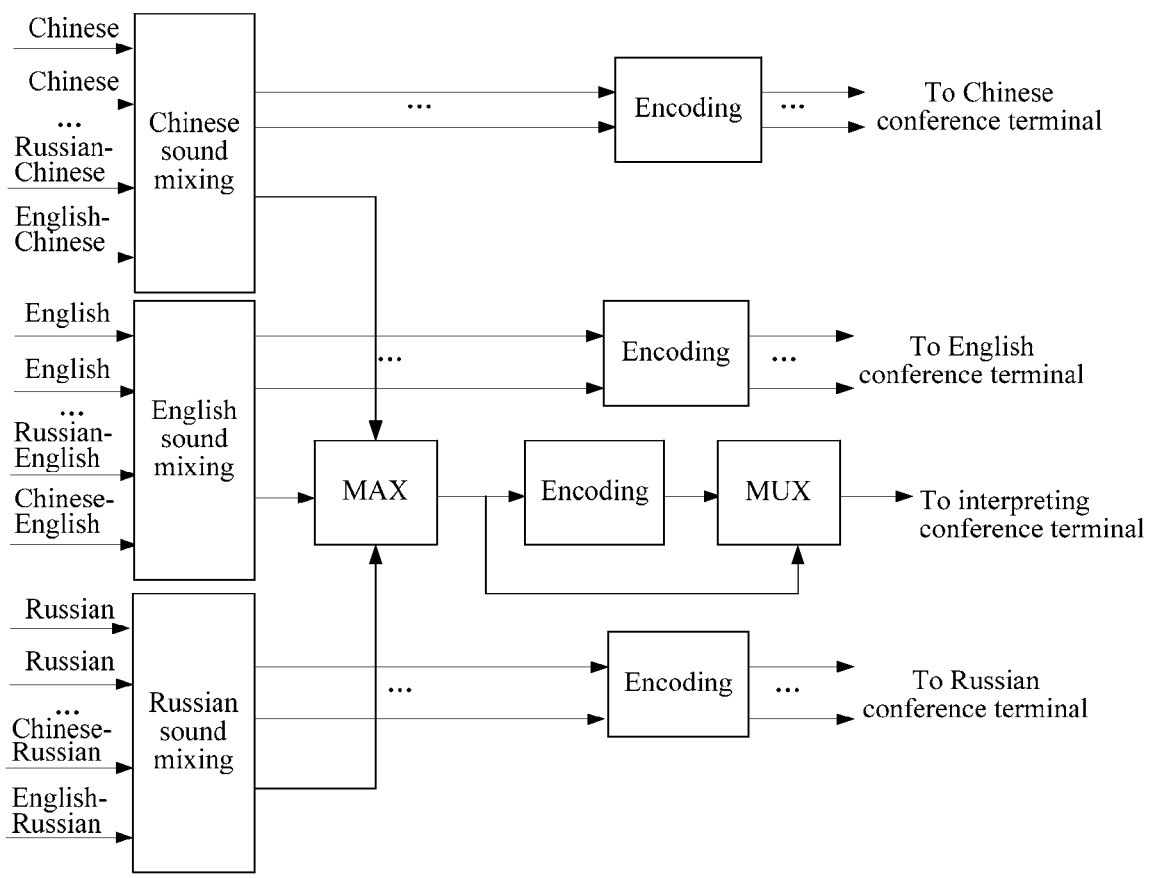
FIG. 8 is a schematic view of a sound mixing scheme when three languages including Chinese, English and Russian exist in the system according to the first embodiment of the present invention.

A multi-language conference in two languages of Chinese and English is described above for the ease of illustration, and any multi-language conference in two languages may be implemented according to the above method. The number of languages holding a conference simultaneously may be greater than two. When a language is added, the processing of terminals does not change, and the MCU adds a mixer accordingly. As shown in FIG. 8, taking a conference in three languages including Chinese, English and Russian as an example, three interpreting terminals are provided, one is used for providing Chinese-English interpretation, one is used for realizing Chinese-Russian interpretation, and one is used for realizing English-Russian interpretation. The sound mixing result of Chinese, English and Russian is sent to the respective listening conference site. One-party sound mixing is adopted in FIG. 8, data of one party with the highest volume among Chinese, English and Russian is sent to the corresponding interpreting conference terminal after being encoded, and the volume of the interpreting conference terminal does not participate in the comparison. If Chinese is spoken at the highest volume, the Chinese data is sent to Chinese-English and Chinese-Russian interpreting conference sites. If English or Russian is spoken at highest volume, the processing method is similar. In this method, only one of Chinese, English and Russian with the highest volume is interpreted. The situation for four or more languages may be deduced by analog.

The processing of two or more parties sound mixing is similar to the above description, but several more interpreting terminals are needed to interpret the sound of the conference site with the second highest volume.

Figure 9:
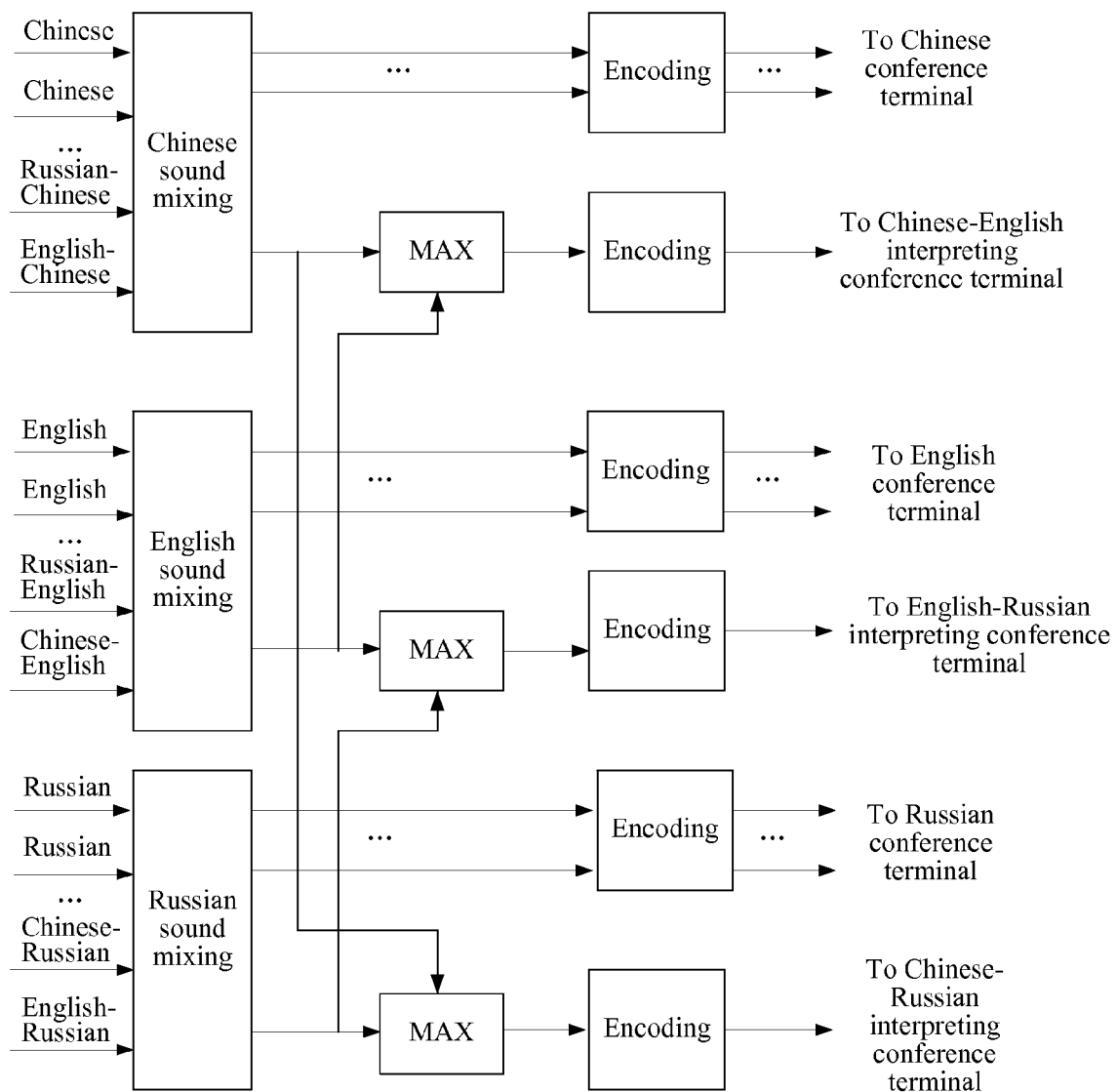
FIG. 9 is a schematic view of a sound mixing scheme when three languages including Chinese, English and Russian exist in the system according to the first embodiment of the present invention.

FIG. 9 shows a more flexible way of implementing sound mixing. In the sound mixing, the volumes are compared for Chinese and English, for Chinese and Russian, and for English and Russian respectively, and data of one party with the highest volume is sent to the corresponding interpreting terminal for interpretation. For example, if Chinese and English are compared in volume size, one party with the higher volume is sent to the Chinese-English interpreting conference terminal. If Chinese and Russian are compared in volume size, the one party with the higher volume is sent to the Chinese-Russian interpreting conference terminal. If English and Russian are compared in volume size, the one party with the higher volume is sent to the English-Russian interpreting conference terminal. The interpreted audio data participates in the sound mixing of the corresponding language. For example, the data participating in Chinese sound mixing contains the data of Chinese, Chinese interpreted from English, and Chinese interpreted form Russian. Chinese sound mixing includes one-party sound mixing, two-party sound mixing, three-party sound mixing, and even more party sound mixing. In Chinese sound mixing, the volume of Chinese interpreted from English participates in the sound mixing according to the volume of English, and the volume of Chinese interpreted from Russian participates in the sound mixing according to the volume of Russian. The sound mixing processing of English and Russian are similar to that of Chinese, and the situation for four or more languages may be deduced by analog.

In FIG. 9, two or more party sound mixing may also be implemented between every two languages, but interpreting terminals are to be increased accordingly.

A second embodiment of the system of the present invention is described below.

The conference terminals and the interpreting terminal use only one input and output interface. The conference terminals need to inform the MCU its language or inform the MCU that it is an interpreting terminal in a manner of signaling. The MCU adopts the mixing of sounds from multiple sound channels. Codecs used by the conference terminals, the interpreting terminal, and the MCU are single-channel codecs. Various parts are described in detail as follows.

Figure 10:
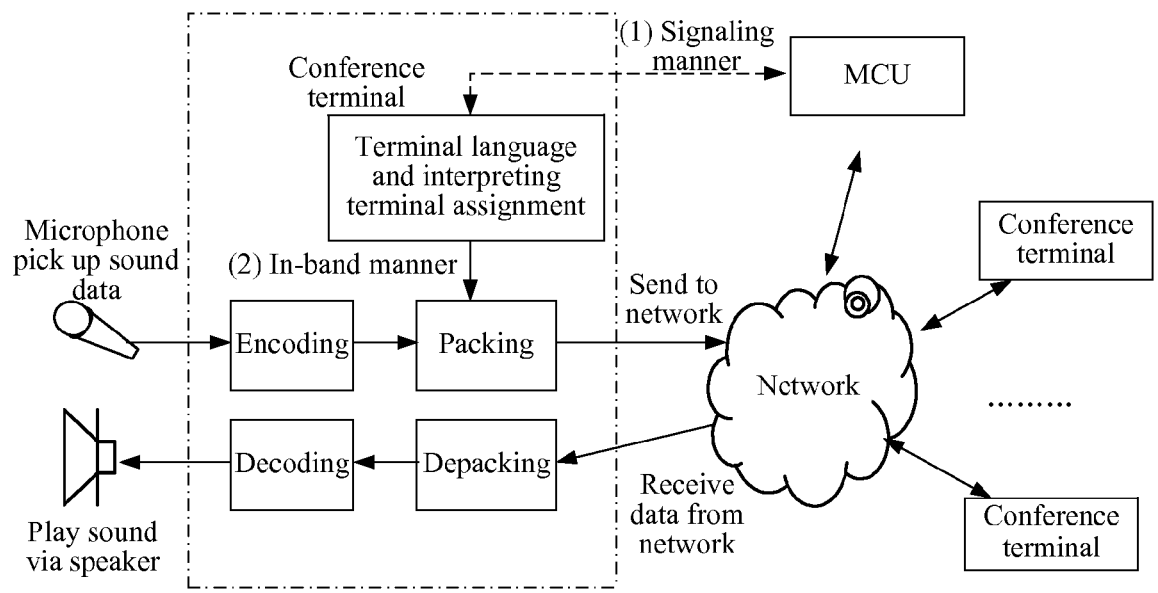
FIG. 10 is a schematic view of the relationship between conference terminals and a multipoint control unit in the system according to a second or a third embodiment of the present invention.

The implementation of the conference terminals is substantially the same as that in the first embodiment. What is different is that as shown in FIG. 10, the conference terminals support language assignment for the conference sites, and confirm the MCU the languages of the conference sites through signaling such as H.245. For example, a conference terminal selects Chinese as the language, and the MCU is informed that the conference terminal belongs to a Chinese conference site.

The implementation of the interpreting terminal is the same as that in the first embodiment, what is different is that the conference terminal is assigned as the interpreting terminal, and the MCU is informed that the conference terminal is the interpreting terminal through signaling such as H.245.

The implementation of the MCU is the same as that in the first embodiment, what is different is that the MCU knows the language assigned for the conference terminals or whether or not a conference terminal serves as the interpreting terminal through signaling such as H.245. That is, the conference site attribute assignment information in FIG. 7 is obtained from the conference terminals through signaling such as H.245.

A third embodiment of the system of the present invention is described below.

The conference terminals and the interpreting terminal use only one input and output interface. The conference terminal needs to inform the MCU its language in an in-band manner, or inform the MCU that it is an interpreting terminal. The MCU adopts the mixing of sounds from multiple sound channels. Codecs used by the conference terminals, the interpreting terminal, and the MCU are single-channel codecs. Various parts are described in detail as follows.

The implementation of the conference terminal is the same as that in the second embodiment, what is different is that the conference terminal receives and encodes the input audio data, and packs the encoded code stream and the language information corresponding to the code stream for sending to the MCU. See FIG. 10, for example, the Chinese conference terminal adds Chinese identifiers in the code stream to be sent to the MCU, and the English conference terminal adds English identifiers in the code stream to be sent to the MCU, rather than indicating the MCU its language through signaling.

The implementation of the interpreting terminal is the same as the second embodiment, what is different is that the conference terminal is assigned as an interpreting terminal, the interpreting terminal adds an identifier of the interpreting terminal in the code stream to be sent to the MCU for informing the MCU that it is the interpreting terminal, rather than indicating the MCU its identity as the interpreting terminal through signaling, see FIG. 10.

Figure 11:
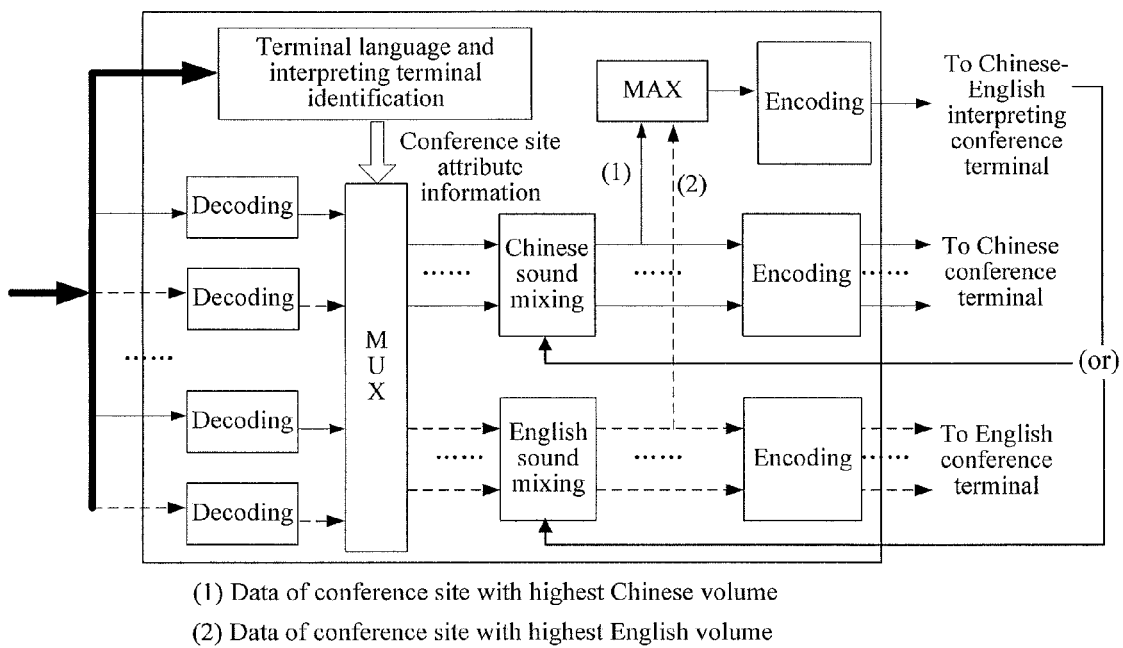
FIG. 11 is a schematic view of an implementing scheme of a multipoint control unit in the system according to the third embodiment of the present invention.

The implementation of the MCU is the same as that in the second embodiment, what is different is that, see FIG. 11, the MCU determines the language of the code stream and whether or not the conference terminal is an interpreting terminal by analyzing the received audio code stream, rather than through signaling.

A fourth embodiment of the system of the present invention is described below.

Sometimes, on one conference site, there may be speeches given or listened to in multiple languages. If the multiple languages on the conference site are spoken in speeches alternately, the language of the conference terminal needs to be updated continuously according to the foregoing method, which is quite inconvenient in operation. In this implementation, the conference terminal uses multiple input-output interfaces.

Figure 12:
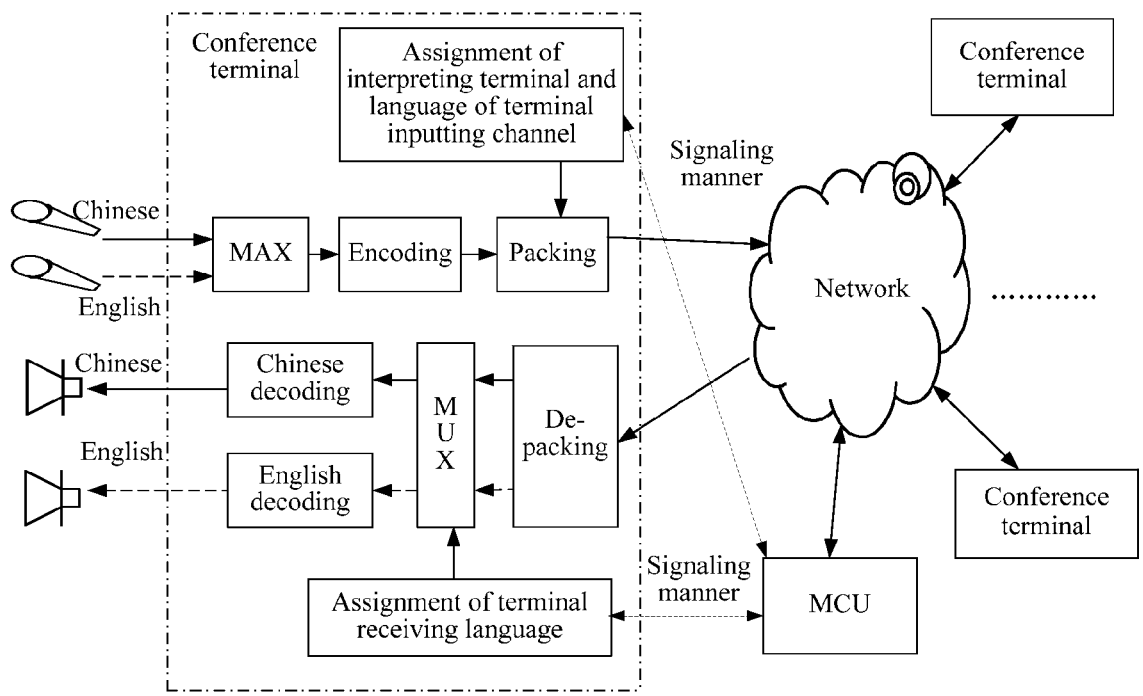
FIG. 12 is a schematic view of a system according to a fourth embodiment of the present invention.

The conference terminal has two input channels, a channel language allocation module of the conference terminal assigns the language corresponding to each input channel, for example, Chinese corresponds to channel 1, and English corresponds to channel 2. The data of channel 1 and channel 2 is compared first in volume before being sent to an encoder, the party with the higher volume is sent to the encoder for encoding, as shown in FIG. 12. The language information corresponding to the channel is added to the encoded code stream before the encoded code stream is sent to the MCU. For example, when only Chinese language is spoken on a conference site, the data in the channel 1 is sent to the encoder for encoding, and the encoded code stream is sent to the MCU after the identifier of Chinese is marked in the code stream. When only English language is spoken on the conference site, the data in the channel 2 is sent to the encoder for encoding, and the encoded code stream is sent to the MCU after the identifier of English is marked in the code stream. If Chinese and English languages are spoken at the same time, the party with the higher volume is sent to the MCU after being encoded and added with corresponding language information.

The conference terminal being assigned as the interpreting terminal adds the interpreting terminal identifier in the code stream for sending to the MCU. Of course, the conference terminal being assigned as the interpreting terminal may also indicate the MCU its identity through signaling such as H.245.

As shown in FIG. 11, after receiving the audio code stream from the conference terminal, the MCU identifies the language corresponding to the code stream and whether or not the code stream is from the interpreting terminal through the terminal language and the identifier of the interpreting terminal. After being decoded, the code stream is sent to mixers for different languages for sound mixing according to the language information after being identified. For example, Chinese language is sent to a Chinese mixer for sound mixing, and English language is sent to an English mixer for sound mixing. After the sound mixing, the sound mixing results of Chinese and English are paired one by one according to volume size, encoded and marked with language identifiers respectively, and then sent to corresponding receiving conference terminals. For example, the pair with the highest volume including Chinese sound mixing output and English sound mixing output is sent to the conference sites that receives the highest volume of Chinese or English.

As shown in FIG. 12, in this scheme, the conference terminals may also select languages to receive. The conference terminals inform the MCU the language they select to receive through signaling such as H.245. After sound mixing, the MCU sends the mixed data to the conference terminals according to the language information that the conference terminals select to listen to. If the conference terminal selects to listen to the language information of Chinese and English, the data sent to the conference terminal by the MCU is processed as described above. If the conference terminal only selects to listen to Chinese, the result after Chinese sound mixing is sent to the corresponding receiving conference terminal, and English is processed similarly. The interpreting terminal needs to be set so as to receive both Chinese and English languages.

The conference terminal decodes selectively or all of the received MCU code streams according to assignment of the language to be listened to, and then output the decoded code streams to corresponding output channels. For example, if the output channel 1 is assigned to output Chinese, the output channel 2 is assigned to output English, when the conference terminal receives Chinese and English code streams, the conference terminal decodes the code streams respectively, and outputs the decoded code streams to corresponding output channels. If the output channel 1 is only assigned to output Chinese, the data of English code stream is discarded, and only the data of Chinese code stream is decoded and sent to the output channel 1 for outputting. If the output channel 2 is only assigned to output English, the data of Chinese code stream is discarded, only the data of English code stream is decoded and sent to the output channel 2 for outputting.

The audio data sent to the interpreting terminal and the language sound mixing in which the interpreting terminal participates is processed as follows. The MCU compares the volume size of the received Chinese and English audio data (the interpreting terminal does not participate in the volume comparison), sends the audio data with the highest volume to the interpreting conference site. If Chinese is spoken at the highest volume, the language of audio data sent to the interpreting terminal is Chinese, and in the next sound mixing, the audio data of the interpreting terminal received by the MCU participates in the English language sound mixing. If English is spoken at the highest volume, the language of audio data sent to the interpreting terminal is English, and after completion of the interpretation, the interpreting terminal sends the interpreted Chinese data to the MCU for participating in the Chinese language sound mixing.

A fifth embodiment of the system of the present invention is described below.

This scheme is similar to scheme 4, the differences include that multi-channel encoders are adopted.

Figure 13:
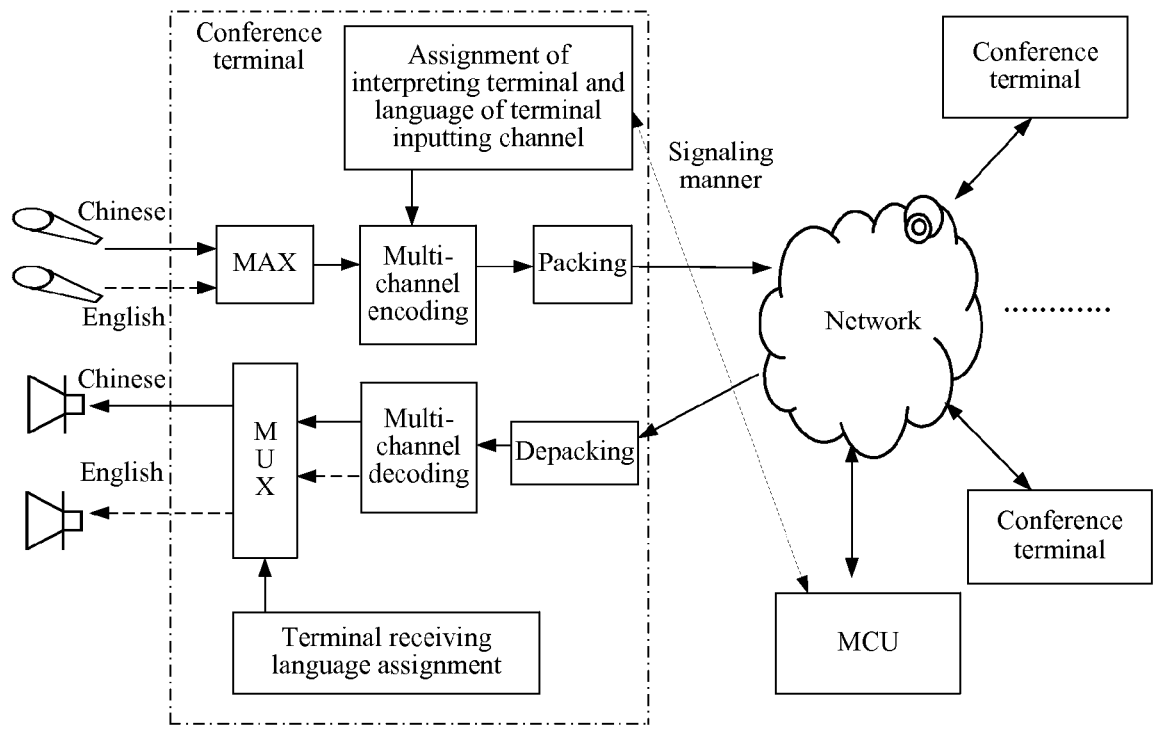
FIG. 13 is a schematic view of a system according to a fifth embodiment of the present invention.

As is shown in FIG. 13, the difference between the processing of the conference terminal in this scheme and that in scheme 4 lies in that, the encoding of different languages corresponds to encoding sound channels of the multi-channel encoder. For example, Chinese is encoded correspondingly in a left channel, English is encoded in a right channel, and the encoded data is sent to the MCU after being packed.

The conference terminal being assigned as the interpreting terminal adds interpreting terminal identifier in the code stream to be sent to the MCU. It may also indicate the MCU its identity through signaling such as H.245.

Figure 14:
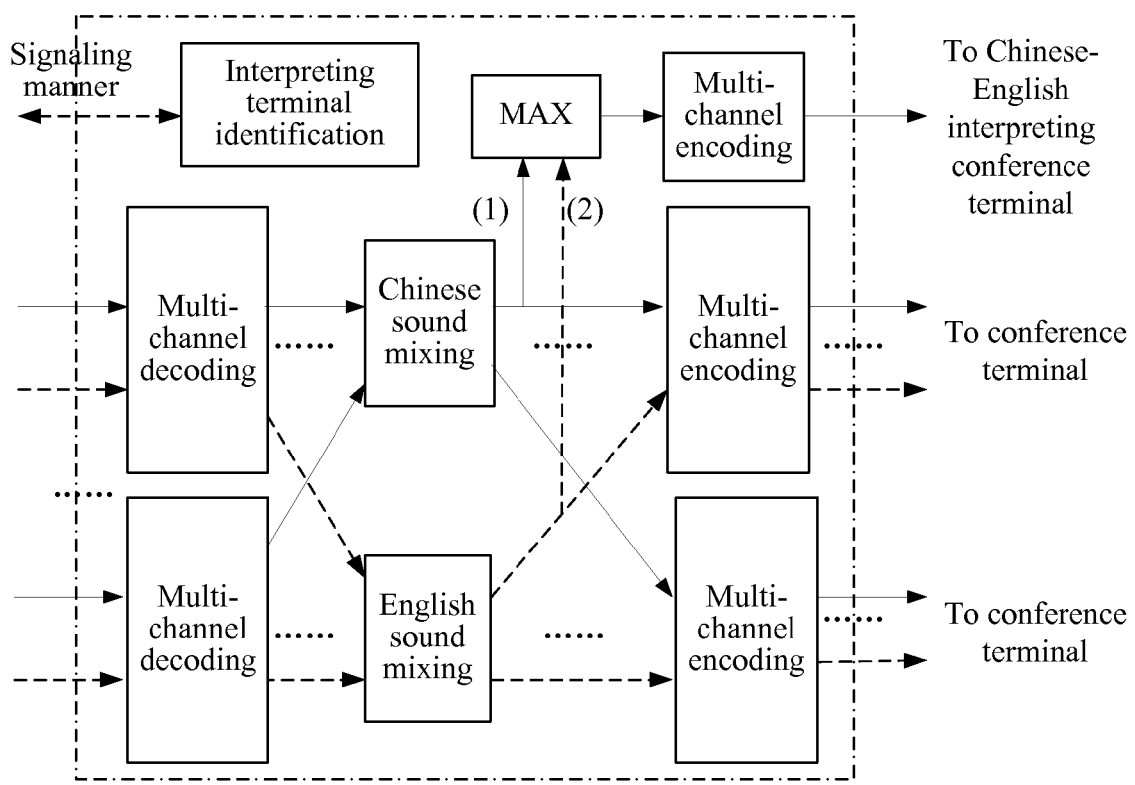
FIG. 14 is a schematic view of an implementing scheme of a multipoint control unit in the system according to the fifth embodiment of the present invention.

As is shown in FIG. 14, the MCU receives and decodes the audio code stream sent from the conference terminal, and then delivers sound channel data to corresponding mixers for sound mixing. For example, the data of the left channel is delivered to the Chinese mixer for sound mixing, and the data of the right channel is delivered to the English mixer for sound mixing. After the sound mixing, the sound mixing results of Chinese and English are paired one by one according to volume size, encoded in the corresponding sound channels of the multi-channel encoder, and then sent to the conference terminals.

The conference terminal receives and decodes the code stream sent by the MCU, and sends the decoded data of corresponding language to the output channel according to the selected output language. The interpreting terminal is set to receive both Chinese and English languages.

The audio data sent to the interpreting terminal and the language sound mixing in which the interpreting terminal participates are processed as follows. The MCU compares the volume size of the received Chinese and English audio data (the interpreting terminal does not participate in the volume comparison), sends the audio data with the highest volume sent to the interpreting conference site. If Chinese language is spoken at the highest volume, the language of audio data sent to the interpreting terminal is Chinese, and in the next sound mixing, the audio data of the interpreting terminal received by the MCU participates in the English language sound mixing. If English is spoken at the highest volume, the language of audio data sent to the interpreting terminal is English, and after completion of the interpretation, the interpreting terminal sends the interpreted Chinese data to the MCU for participating in the Chinese language sound mixing.

Figure 15:
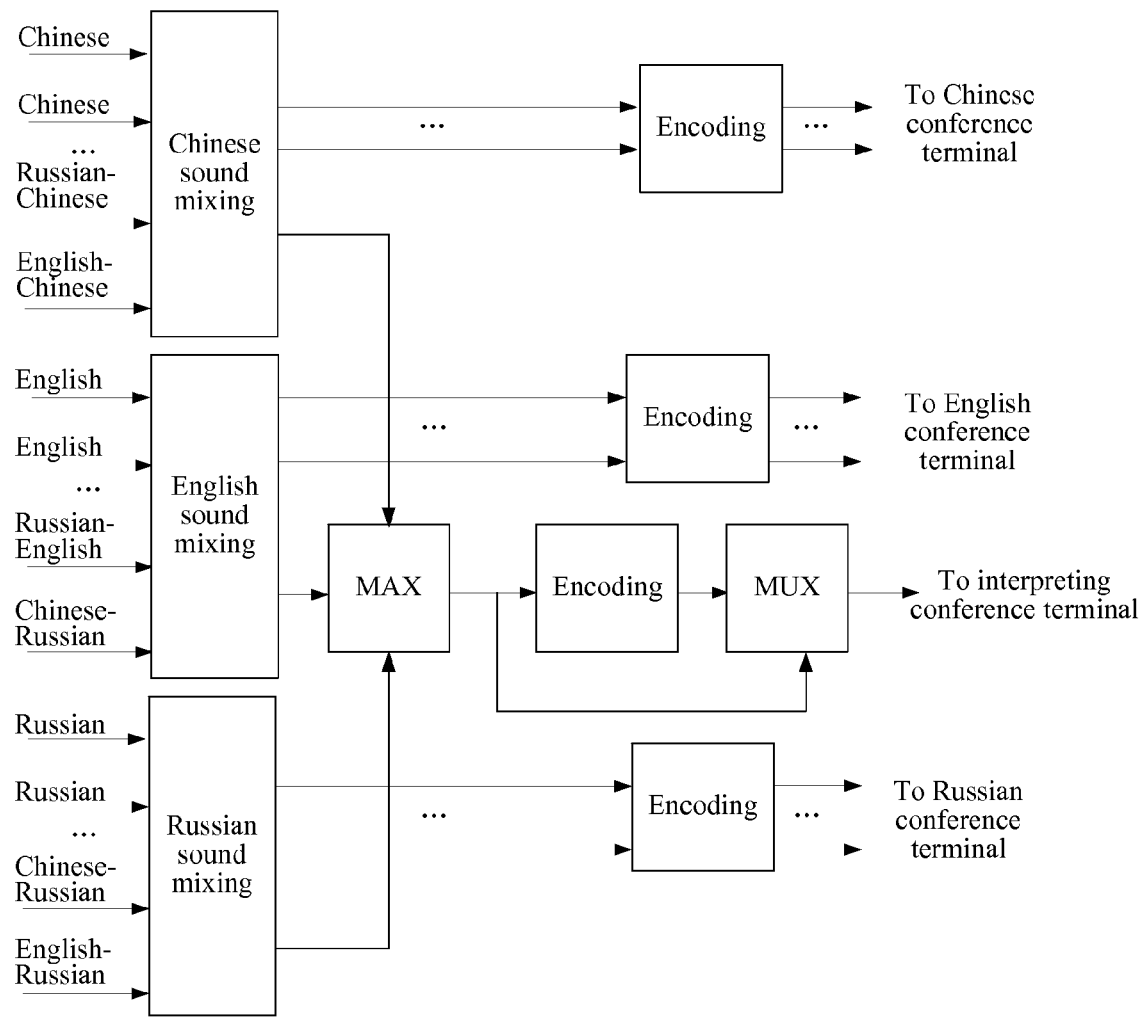
FIG. 15 is a first schematic view of a sound mixing solution when three languages including Chinese, English and Russian exist in the system according to an embodiment of the present invention.

A multi-language conference in two languages of Chinese and English is described above for the ease of illustration, and the multi-language conference in any two languages may be implemented according to the above-mentioned method. The number of languages simultaneously used when holding a conference may be greater than two. When a language is added, the processing of terminals does not change, but the MCU adds a mixer accordingly. As shown in FIG. 15, taking a conference in three languages of Chinese, English and Russian as an example, the sound mixing result of Chinese, English and Russian is sent to their respective listening conference site. In addition, one party among Chinese, English and Russian with the highest volume is sent to the corresponding interpreting conference terminal after being encoded. It should be noted that the volume from the interpreting terminal does not participate in the comparison. If Chinese is spoken at the highest volume, the Chinese data is sent to Chinese-English and Chinese-Russian interpreting conference sites. If English or Russian is spoken at the highest volume, the processing method is similar. In this method, only one party of Chinese, English and Russian with the highest volume is interpreted. The situation for four or more languages may be deduced by analog.

Figure 16:
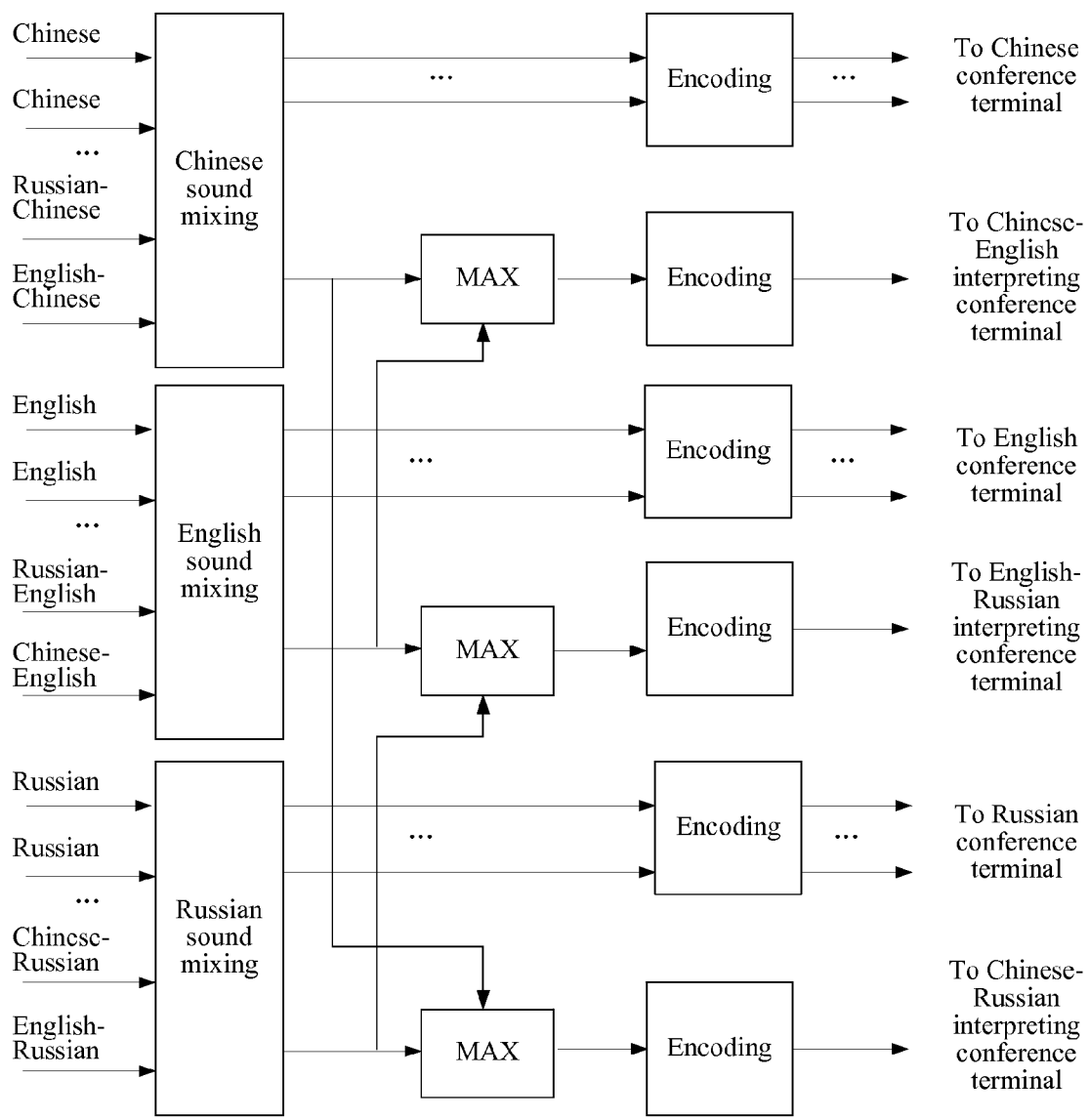
FIG. 16 is a second schematic view of a sound mixing solution when three languages including Chinese, English and Russian exist in the system according to an embodiment of the present invention.

FIG. 16 is a more flexible way for implementing sound mixing. After the sound mixing, the volumes are compared for Chinese and English, for Chinese and Russian, and for English and Russian respectively, and then the languages are sent to corresponding interpreting terminals for interpretation. In this way, participants on the conference sites of Chinese, English and Russia may be spoken at the same time. The situation for four or more languages may be deduced by analog.

Implementation embodiments of the method of the present invention are described below.

Being the same as the embodiment of the above system embodiments, various conference sites are first assigned with the language information and the input-output interfaces connecting conference terminals correctly for respective conference sites, a conference site is assigned as an interpreting conference site responsible for interpreting the speeches of the conference sites. When only two languages exist in a multipoint conference system, it is enough to assign one conference site as the interpreting conference site. When more than three languages exist, multiple interpreting conference sites should be assigned. Each conference terminal transforms the speech of the conference into audio data for sending to the multipoint control unit. The method further includes the following steps:

The interpreting conference site performs simultaneous interpretation on the speeches of the conference sites, and sends the interpreted speeches to the multipoint control unit according to language types.

The multipoint control unit mixes the audio data from the conference terminals in different sound channels according to language types, and sends the processed audio data to the conference terminals according to the language preset by the multipoint control unit or the language selection of the conference terminals.

The conference terminals process the audio data from the multipoint control unit and output the processed audio data.

The implementations of the conference terminals and the multipoint control unit may be obtained with reference to the first to fifth embodiments of the above system, which are not described in detail here.

When using the method, no matter for the case in which only participants on the interpreting conference site speak, or the case in which only participants on other conference sites speak, or the case in which both the interpreting conference site and other conference sites participate in the speaking, processing in different sound channels according to language types may be realized successfully, the speech contents in various languages do not disturb each other, and various conference sites may select the language they need to participate in the conference.

The above embodiments of the present invention take the Chinese and English conference as an example, but in practical application process of the embodiment of the present invention, the languages used in the conference are not limited to Chinese and English, and may be a combination of any two languages. The languages used in the conference are not limited to two kinds, and may be three kinds or more. The sound mixing policies used by the multipoint control unit are not limited to the method used by the conventional art, and other sound mixing policies are applicable as well. When the system and method according to the embodiment of the present invention are used, each of the conference sites may participate in the conference according to the language it selects. For example, when three languages of Chinese, English and Russian exist in the conference system, it is enough to provide three sound channels to process the audio data of corresponding languages. Three interpreting conference sites are assigned at the same time, namely Chinese-English interpreting conference site, Chinese-Russian interpreting conference site, and English-Russian interpreting conference site. Each conference site decides to output only the language it needs according to assignment information, and shields useless speech information.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method for providing a multi-language conference in a multipoint control unit, where each conference site of the multi-language conference uses a selected language to participate in the multi-language conference, the method comprising:
receiving first audio data from a first conference terminal, wherein the first conference terminal is assigned a first language type;
receiving second audio data from a second conference terminal, wherein the second conference terminal is assigned a second language type, wherein the second language type is different from the first language type;
decoding the first audio data;
decoding the second audio data;
sending the decoded first audio data to a first language type sound mixer according to the language type of the first conference terminal;
sending the decoded second audio data to a second language type sound mixer according to the language type of the second conference terminal;
selecting the decoded first audio data by determining that a volume of the decoded first audio data is higher than a volume of the decoded second audio data;
sending the decoded first audio data to an interpreting terminal;
receiving translated audio data of the decoded first audio data from the interpreting terminal; and
sending the translated audio data to the second language type sound mixer.

2. The method according to claim 1, wherein the language types of the conference terminals are assigned by the multipoint control unit.

3. The method according to claim 1, wherein the multipoint control unit is informed that the first conference terminal is assigned the first language type through signaling and the second conference terminal is assigned the second language type through signaling.

4. The method according to claim 1, wherein the multipoint control unit is informed that the first conference terminal is assigned the first language type according to an first language type identifier added in the first audio data and the second conference terminal is assigned the second language type according to an second language type identifier added in the second audio data.

5. The method according to claim 1, wherein the first language type sound mixer compares audio data from different conference terminals and selects audio data from at least one conference terminal according to volume of the audio data from different conference to be broadcasted to other conference terminals assigned the first language type.

6. A computer program, for providing a multi-language conference in a multipoint control unit, where each conference site of the multi-language conference uses a selected language to participate in the multi-language conference, the computer program stored on a non-transitory computer readable memory further comprising computer executable instructions that when executed implement the following:
receiving first audio data from a first conference terminal, wherein the first conference terminal is assigned a first language type;
receiving second audio data from a second conference terminal, wherein the second conference terminal is assigned a second language type wherein the second language type is different from the first language type;
decoding the first audio data; decoding the second audio data;
sending the decoded first audio data to a first language type sound mixer according to the language type of the first conference terminal;
sending the decoded second audio data to a second language type sound mixer according to the language type of the second conference terminal;
selecting the decoded first audio data by determining that a volume of the decoded first audio data is higher than a volume of the decoded second audio data;
sending the decoded first audio data to an interpreting terminal;
receiving translated audio data of the decoded first audio data from the interpreting terminal; and
sending the translated audio data to the second language type sound mixer.

7. The computer program product according to claim 6, wherein the language types of the conference terminals are assigned by the multipoint control unit.

8. The computer program product according to claim 6, wherein the multipoint control unit is informed that the first conference terminal is assigned the first language type through signaling and the second conference terminal is assigned the second language type through signaling.

9. The computer program product according to claim 6, wherein the multipoint control unit is informed that the first conference terminal is assigned the first language type according to an first language type identifier added in the first audio data and the second conference terminal is assigned the second language type according to an second language type identifier added in the second audio data.

10. The computer program product according to claim 6, wherein the first language type sound mixer compares audio data from different conference terminals and selects audio data from at least one conference terminal according to volume of the audio data from different conference to be broadcasted to other conference terminals assigned the first language type.

\* \* \* \* \*